US010423965B2

(12) United States Patent
Williams

(10) Patent No.: US 10,423,965 B2
(45) Date of Patent: Sep. 24, 2019

(54) METHOD AND APPARATUS FOR ESTABLISHING AND MAINTAINING PCI DSS COMPLIANT TRANSACTION FLOWS FOR BANKING ENTITIES LEVERAGING NON-EMV TOKENS

(71) Applicant: MUFG Union Bank, N.A., San Francisco, CA (US)

(72) Inventor: Branden R. Williams, Flower Mound, TX (US)

(73) Assignee: MUFG Union Bank, N.A., San Francisco, CA (US)

( * ) Notice: Subject to any disclaimer, the term of this patent is extended or adjusted under 35 U.S.C. 154(b) by 525 days.

(21) Appl. No.: 15/346,661

(22) Filed: Nov. 8, 2016

(65) Prior Publication Data

US 2018/0108014 A1    Apr. 19, 2018

Related U.S. Application Data

(60) Provisional application No. 62/409,312, filed on Oct. 17, 2016.

(51) Int. Cl.
*G06Q 20/40* (2012.01)
*G06Q 20/36* (2012.01)
*G06Q 20/38* (2012.01)

(52) U.S. Cl.
CPC ....... *G06Q 20/409* (2013.01); *G06Q 20/3674* (2013.01); *G06Q 20/3829* (2013.01); *G06Q 2220/00* (2013.01)

(58) Field of Classification Search
CPC ............ G06Q 20/409; G06Q 20/3674; G06Q 20/3829; G06Q 2220/00

USPC .......................................................... 705/67
See application file for complete search history.

(56) References Cited

U.S. PATENT DOCUMENTS

| 6,327,578 B1* | 12/2001 | Linehan | G06Q 20/02 705/65 |
| 2011/0154466 A1* | 6/2011 | Harper | G06F 21/335 726/9 |
| 2015/0032627 A1* | 1/2015 | Dill | G06Q 20/385 705/44 |
| 2015/0161596 A1* | 6/2015 | McCarthy | G06Q 20/02 705/67 |

(Continued)

OTHER PUBLICATIONS

PCI Data Security Standard (PCI DSS), version 2.0, Mar. 2011.*
EMV Payment Tokenisation Specification Technical Framework, EMVCo, Version 1.0, Mar. 2014, 84 pages (Year: 2014).*

*Primary Examiner* — James D Nigh
(74) *Attorney, Agent, or Firm* — Perkins Coie LLP

(57) ABSTRACT

A payment processor or network receives an incoming PAN pursuant to a payment card transaction between a merchant and a customer and translates the PAN into a token having a token value for N digits within a middle portion of the PAN, while preserving a PAN value for M digits within a terminal portion of the PAN. Pursuant to generation of the token, the payment processor or network performs BIN substitution on the PAN to replace the BIN within the PAN with a different BIN. The payment processor or network sends the token downstream for downstream processing of the transaction. Upon completion of downstream processing, the payment processor or network translates the token back into a PAN for any further processing of the transaction upstream.

11 Claims, 7 Drawing Sheets

(56) References Cited

U.S. PATENT DOCUMENTS

2015/0199689 A1* 7/2015 Kumnick ........... G06Q 20/3674
                                                  705/67
2016/0350746 A1* 12/2016 Johnson ................. H04L 67/10
2017/0017959 A1* 1/2017 Keresman, III ....... G06Q 20/40

* cited by examiner

METHOD AND APPARATUS FOR ESTABLISHING AND MAINTAINING PCI DSS COMPLIANT TRANSACTION FLOWS FOR BANKING ENTITIES LEVERAGING NON-EMV TOKENS

CROSS REFERENCE TO RELATED APPLICATIONS

This application claims priority to U.S. provisional patent application Ser. No. 62/409,312, filed Oct. 17, 2016, which is incorporated herein in its entirety by this reference thereto.

FIELD

Embodiments of the invention relate to establishing and maintaining PCI DSS compliant transaction flows. More particularly, embodiments of the invention relate to establishing and maintaining PCI DSS compliant transaction flows for banking entities by leveraging non-EMV tokens.

BACKGROUND

PCI DSS

The Payment Card Industry Data Security Standard (PCI DSS) is a proprietary information security standard for organizations that handle branded credit cards from the major card schemes, including Visa, MasterCard, American Express, Discover, and JCB. The PCI Standard is mandated by the card brands and administered by the Payment Card Industry Security Standards Council. The standard was created to increase controls around cardholder data to reduce credit card fraud. Validation of compliance is performed annually, either by an external Qualified Security Assessor (QSA) or by a firm specific Internal Security Assessor (ISA) that creates a Report on Compliance (ROC) for organizations handling large volumes of transactions, or by Self-Assessment Questionnaire (SAQ) for companies handling smaller volumes.

The PCI Data Security Standard specifies twelve requirements for compliance, organized into six logically related groups called control objectives.

Each version of PCI DSS has divided these twelve requirements into a number of sub-requirements differently, but the twelve high-level requirements have not changed since the inception of the standard. See table 1 below.

TABLE 1

| PCI DSS Requirements | |
| --- | --- |
| Control objectives | PCI DSS requirements |
| Build and maintain a secure network | 1. Install and maintain a firewall configuration to protect cardholder data |
| | 2. Do not use vendor-supplied defaults for system passwords and other security parameters |
| Protect cardholder data | 3. Protect stared cardholder data |
| | 4. Encrypt transmission of cardholder data across open, public networks |
| Maintain a vulnerability management program | 5. Use and regularly update anti-virus software on all systems commonly affected by malware |
| | 6. Develop and maintain secure systems and applications |
| Implement strong access control measures | 7. Restrict access to cardholder data by business need-to-know |
| | 8. Assign a unique ID to each person with computer access |
| | 9. Restrict physical access to cardholder data |
| Regularly monitor and test networks | 10. Track: and monitor all access to network resources and cardholder data |

TABLE 1-continued

| PCI DSS Requirements | |
| --- | --- |
| Control objectives | PCI DSS requirements |
| | 11. Regularly test security systems and processes |
| Maintain an information security policy | 12. Maintain a policy that addresses information security |

Payment Card Numbers

A payment card number, or simply a card number, is the card identifier found on payment cards, such as credit cards and debit cards, as well as stored-value cards, gift cards, and other similar cards. In some situations, the card number is referred to as a bank card number. The card number is merely a card identifier and does not identify the account to which it is linked by the issuing company, nor does it identify the cardholder. The card number identifies the issuer of the card, which is then electronically associated by the issuing organization with one of its customers and then to the customer's designated bank accounts. In the case of stored-value type cards, there is no necessary association with a particular customer. Card numbers are allocated in accordance with ISO/IEC 7812. The card number is usually prominently embossed on the front of a payment card.

The payment card number differs from the Bank Identifier Code (BIC/ISO 9362, a normalized code—also known as Business Identifier Code, Bank International Code, and SWIFT code). It also differs from Universal Payment Identification Code, another identifier for a bank account in the United States.

The leading six digits of the card number is the issuer identification number (IIN), sometimes referred to as the bank identification number (BIN). The remaining numbers on the card are referred to as the primary account number or PAN. IINs and PANS have a certain level of internal structure and share a common numbering scheme set by ISO/IEC 7812.

Payment card numbers can be up to 19 digits, as follows:
  A six-digit Issuer Identification Number (IIN), the first digit of which is the Major Industry Identifier (MII);
  A variable length (up to 12 digits) individual account identifier; and
  A single check digit calculated using the Luhn algorithm.

Primary Account Number (PAN)

The 14, 15, or 16-digit number that appears on the primary account holder's credit card. Often, the primary account number (PAN) is also called the account number. If the account has a secondary account holder, the secondary user's credit card may have a secondary account number, or both users' cards may use the primary account number, depending on the credit card issuer's policy. In contrast, a business credit card account might have a primary account number that does not appear on any employee's credit card, and secondary account numbers that appear on each employee's card.

The very first digit is called the major industry identifier and it identifies the type of credit card. American Express cards start with a 3, Visa cards start with a 4, MasterCard cards start with a 5, and Discover cards start with a 6. Certain airline credit cards start with a 1 or 2, certain petroleum company cards start with a 7, and certain telecommunications and healthcare cards start with an 8.

The first six digits identify the credit card network associated with the card, such as 601100 for Discover cards. The last digit is a checksum number, which helps prevent criminals from creating fraudulent credit card numbers. The numbers in between the first six digits and the last digit uniquely identify the customer's account.

Credit card companies, such as Visa, ask merchants to take precautions to protect customers' primary account numbers. One such guideline is called PAN truncation. Visa says that merchants are not required to store full account numbers because doing so presents a security risk if there is a data breach. In the United States, a federal law called the Fair and Accurate Credit Transactions Act of 2006 prohibits merchants from printing more than the last five digits of a cardholder's account number on a receipt. Merchants are also prohibited from printing the card's expiration date.

SUMMARY

Embodiments of the invention establish and maintain PCI DSS compliant transaction flows for banking entities by leveraging non-EMV tokens.

A payment processor receives an incoming PAN pursuant to a payment card transaction between a merchant and a customer. The payment processor translates the PAN into a token and produces a token value for N digits within a middle portion of the PAN, while preserving a PAN value for M digits within a terminal portion of the PAN. In this way, a one-to-one relationship is maintained between the PAN and the token. Accordingly, any token resolves to one and only one PAN. As such, each token uniquely and securely corresponds to a PAN while preserving BIN processing and payment card identification.

Pursuant to generation of the token, the payment processor performs bank identification number (BIN) substitution on the PAN to replace the BIN within the PAN with a different BIN.

The payment processor sends the token downstream for downstream processing of the transaction. One or more downstream entities process the transaction with the token. Upon completion of downstream processing, the payment processor translates the token back into a PAN for any further processing of the transaction upstream.

DRAWINGS

DESCRIPTION

Figure 1:
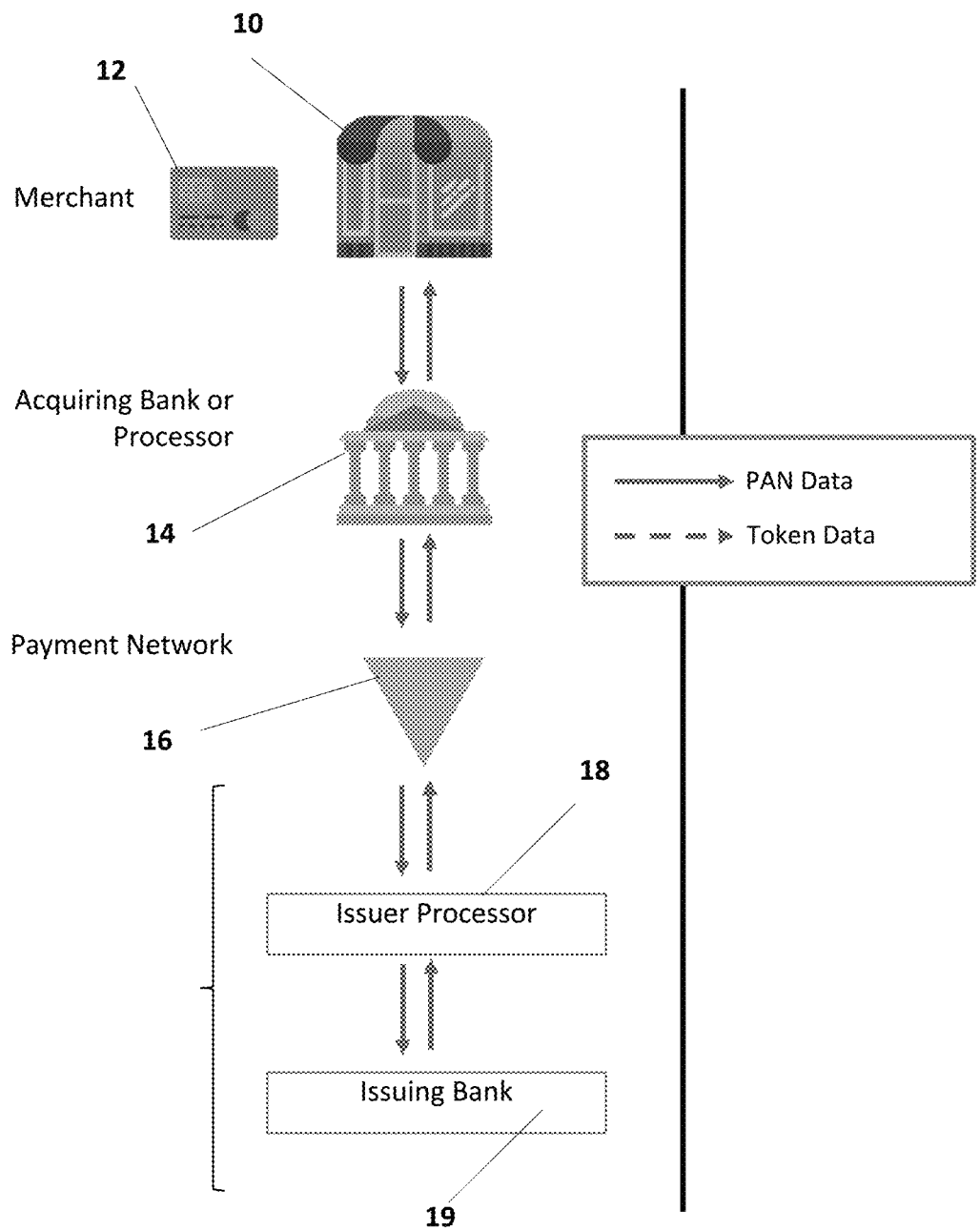
FIG. 1 is a block diagram showing PAN data flows in a state of the art transaction processing system.

FIG. 1 is a flow diagram showing PAN data flows in a state of the art transaction processing system. In FIG. 1, PAN data flows end-to-end during a transaction, i.e. from a merchant 10 engaged in the transaction with a customer 12, e.g. during credit card transaction, to an acquiring bank or processor and issuer 14, e.g. MasterCard, and, thence, from the issuer via a payment network 16, e.g. First Data, via an issuer processor 18 to an issuing bank 19, e.g. MUFG. Unaddressed in the art is the risk to which the issuing bank is exposed by such data flow.

Tokens

Tokenization substitutes a sensitive data element with a non-sensitive equivalent, referred to as a token, that has no extrinsic or exploitable meaning or value. The token is a reference, i.e. identifier, that maps back to the sensitive data through a tokenization system, in embodiments of the invention the token vault 20. The mapping from original data to a token uses methods which render tokens infeasible to reverse in the absence of the tokenization system, for example using tokens created from random numbers. The tokenization system is secured and validated using security best practices applicable to sensitive data protection, secure storage, audit, authentication, and authorization. The tokenization system provides data processing applications with the authority and interfaces to request tokens, or detokenize back to sensitive data.

The security and risk reduction benefits of tokenization require that the tokenization system is logically isolated and segmented from data processing systems and applications that previously processed or stored sensitive data replaced by tokens. Only the tokenization system can tokenize data to create tokens, or detokenize back to redeem sensitive data under strict security controls. The token generation method must be proven to have the property that there is no feasible means through direct attack, cryptanalysis, side channel analysis, token mapping table exposure, or brute force techniques to reverse tokens back to live data.

When tokens replace live data in systems, the result is minimized exposure of sensitive data to those applications, stores, people and processes, reducing risk of compromise or accidental exposure and unauthorized access to sensitive data. Applications can operate using tokens instead of live data, with the exception of a small number of trusted applications explicitly permitted to detokenize when strictly necessary for an approved business purpose. Tokenization systems may be operated in-house within a secure isolated segment of the data center, or as a service from a secure service provider.

One type of known token is reflected in EMV. EMV stands for Europay, MasterCard, and Visa, the three companies that originally created the standard. The standard is now managed by EMVCo, a consortium with control split equally among Visa, MasterCard, JCB, American Express, China UnionPay, and Discover.

EMV is a technical standard for smart payment cards and for payment terminals and automated teller machines that can accept them. EMV cards are smart cards (also called chip cards or IC cards) that store their data on integrated circuits in addition to magnetic stripes (for backward compatibility). These include cards that must be physically inserted (or "dipped") into a reader and contactless cards that can be read over a short distance using radio-frequency identification (RFID) technology. Payment cards that comply with the EMV standard are often called Chip and PIN or Chip and Signature cards, depending on the authentication methods employed by the card issuer. There are standards based on ISO/IEC 7816 for contact cards, and standards based on ISO/IEC 14443 for contactless cards (MasterCard Contactless, PayWave, ExpressPay).

Unfortunately, while the use of an EMV card as a token exists between the merchant 10 and the customer 12, such token does nothing to provide security within the realm of the payment processor, issuer processor, and issuing bank.

Figure 2A:
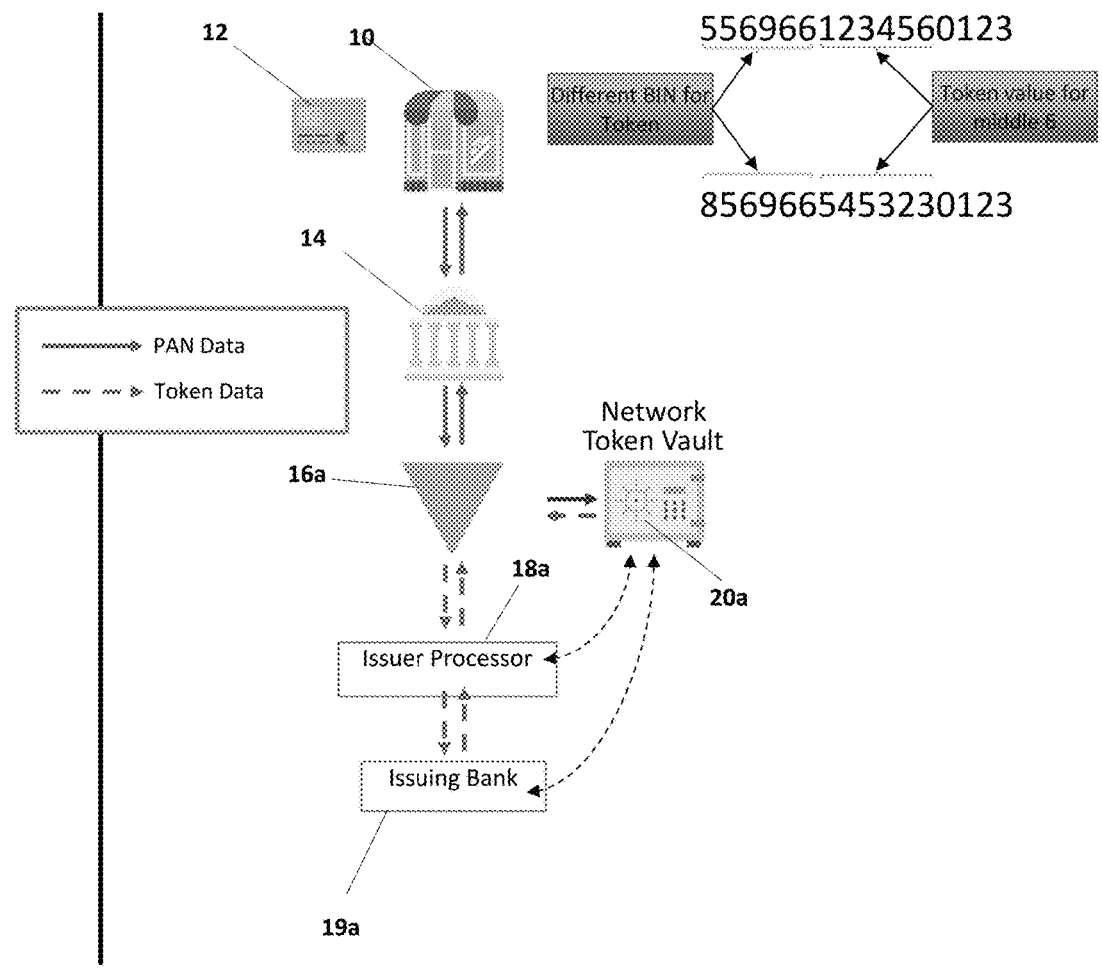
FIGS. 2A and 2B are block diagrams showing BIN processing and PAN data flows in a transaction processing system according to embodiments of the invention.
Figure 2B:
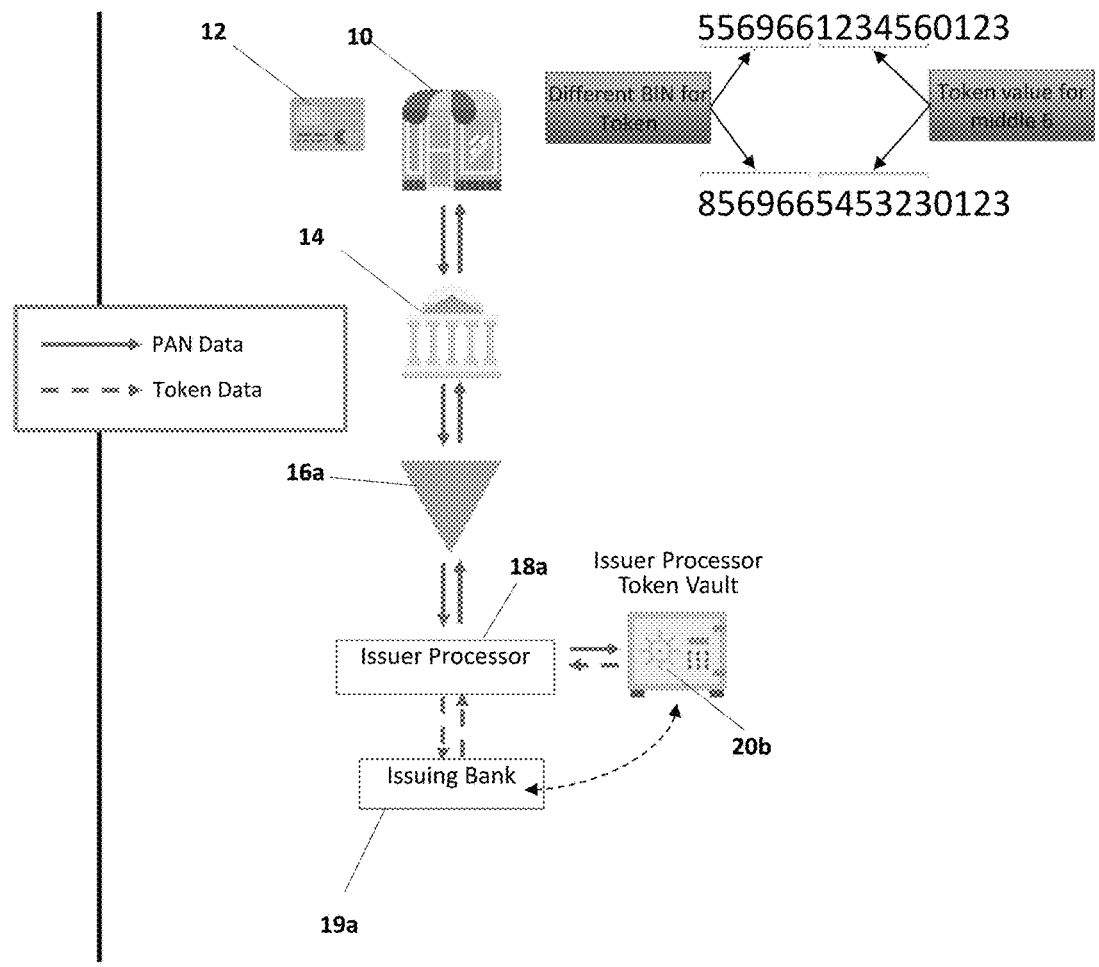

FIGS. 2A and 2B are block diagrams showing BIN processing and PAN data flows in a transaction processing system according to embodiments of the invention. In embodiments of the invention, PAN data flows between the merchant, 10 acquiring bank or processor 14, and issuing bank 19a. However, the network 16a (FIG. 2A) or the issuer processor 18a (FIG. 2B) maintains a token vault 2a/20b, respectively.

As shown in in FIG. 2A, the network 16a translates the incoming PAN into a token before sending it downstream for further processing, for example at the issuer processor 18a. In embodiments of the invention, the issuer processor only has tokens, as does the issuing bank. Any downstream transactions are done with the token, and the payment processor translates this back into a PAN for further processing upstream. Thus, only token data flows at the backend, thereby reducing risk and making the issuing bank PCI compliant by removing all PAN data from the banking systems.

As shown in in FIG. 2B, the issuer processor 18a translates the incoming PAN into a token before sending it downstream for further processing, for example at the issuing bank 19a. In embodiments of the invention, the issuing bank only has tokens. Any transactions at the issuing bank are done with the token, and the issuer processor translates this back into a PAN for further processing upstream. Thus, only token data flows at the issuing bank, thereby reducing risk and making the issuing bank PCI compliant by removing all PAN data from the banking systems.

Also shown on FIGS. 2A and 2B is BIN substitution 22, e.g. a different BIN is used for the token. This allows visual and programmatic identification of the payment number as a token and preserves the BIN for additional processing. Without this element of identification, the payment processor (FIG. 2A) or issuer processor (FIG. 2B) translates an incoming PAN into a token before sending a transaction downstream for further processing.

Because the issuer processor only has tokens (FIG. 2A), as does the issuing bank, any downstream transactions are performed with the token, and the payment processor translates this back into a PAN for further processing upstream. For certain operations, the issuing bank and issuer processor may need to translate a token to a PAN, or vice versa, e.g. for fraud, investigations, and law enforcement. In the case of fraud, PANs are provided to the issuing bank by the network, issuer processor, or potentially law enforcement. To do the proper research for any transactions associated with the PAN, the issuing bank must translate that PAN into a token because all of the bank systems only contain the token. For other law enforcement requests, such as subpoenas, PANs are provided to the issuing bank to research and gather transactional information. The PAN must be translated into the token to perform the research.

The first digit of the PAN identifies the network. As shown in FIGS. 2A and 2B, the number '5' in the BIN 556966 is replaced with an '8', resulting in a BIN of 856966. This allows the issuing bank to know if the number they are handling is a PAN or a token, while preserving the remainder of the BIN for further processing. Only the first digit needs to be changed to a non-network number. For an issuing bank that works with more than one network, additional first digits may be used to identify tokens. The first digit should not start with a 2, 3, 4, 5 or 6. Further, in the example of FIGS. 2A and 2B tokenization produces a token value for the middle six digits of the PAN.

Figure 3:
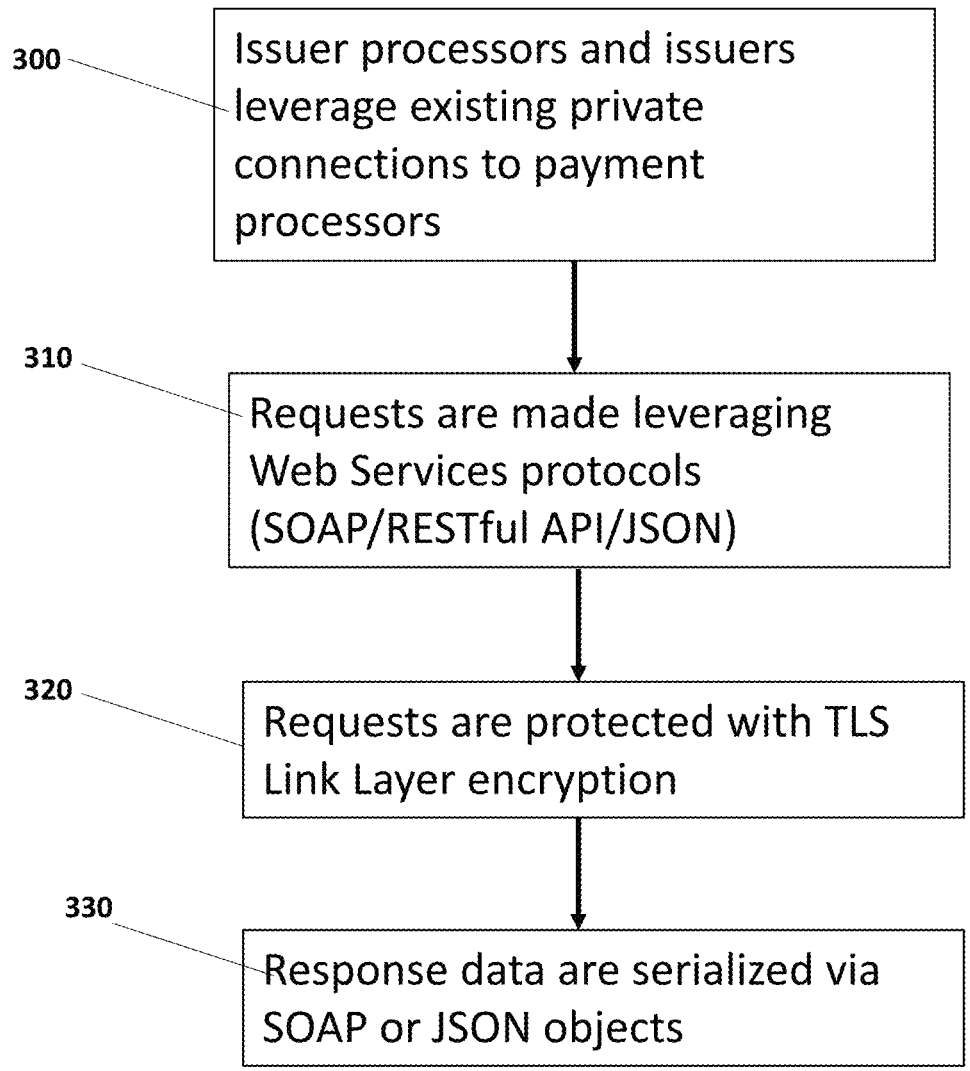
FIG. 3 is a flow diagram showing token vault interaction according to an embodiment of the invention.

FIG. 3 is a block diagram showing token vault interaction according to an embodiment of the invention. In FIG. 3, Interactions between the issuer processor and downstream entities proceed as follows:

Issuer processors and issuers leverage existing private connections to payment processors (300).
Requests are made leveraging Web Services protocols (SOAP or RESTful API/JSON) (310).
Requests are protected with TLS Link Layer encryption (320).
Response data are serialized via SOAP or JSON objects (330).

Figure 4:
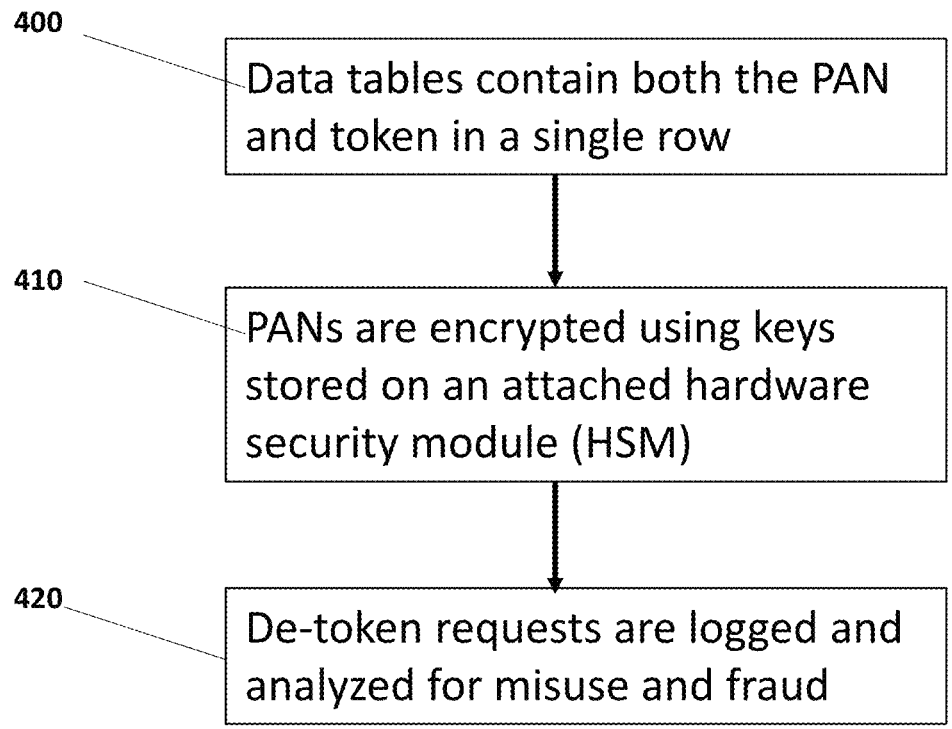
FIG. 4 is a flow diagram showing token vault security according to an embodiment of the invention.

FIG. 4 is a block diagram showing token vault security according to an embodiment of the invention. In FIG. 4, PANs and tokens are secured using access controls, encryption, and an application layer to process token exchange requests:

Data tables contain both the PAN and token in a single row.
PANs are encrypted using keys stored on an attached hardware security module (HSM).
De-token requests are logged and analyzed for misuse and fraud.

Figure 5:
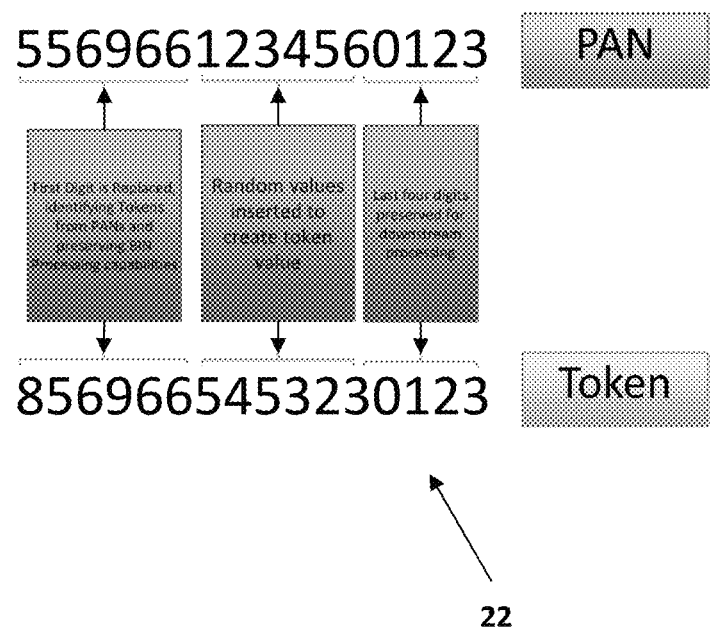
FIG. 5 is a flow diagram showing token construction according to an embodiment of the invention.

FIG. 5 is a diagram showing token construction according to an embodiment of the invention. In FIG. 5, tokens are constructed to preserve BIN processing and card identification. The first number in the PAN is replaced with a replacement value to preserve the remainder of the BIN for processing while clearly identifying the resulting value as a token instead of a PAN. As an example, all cards with a particular network start with a '5' and are replaced with an '8' to identify the value easily as a token. In the case that other leading digits are used, additional replacement digits can be added or the number of digits can be leveraged to differentiate, i.e. 5 is for 16-digit cards, 2 is for 19-digit cards. The middle digits of the PAN are replaced with random values to create a token value.

Embodiments of the invention preserve last four digits of the PAN for downstream processing and identification. This allows the original last four digits, combined with other data elements such as a zip code or name, to identify an account and account holder positively without the full PAN. A one-to-one relationship is thus maintained between the PAN and the token. As such, any token resolves to one and only one PAN.

Computer System

Figure 6:
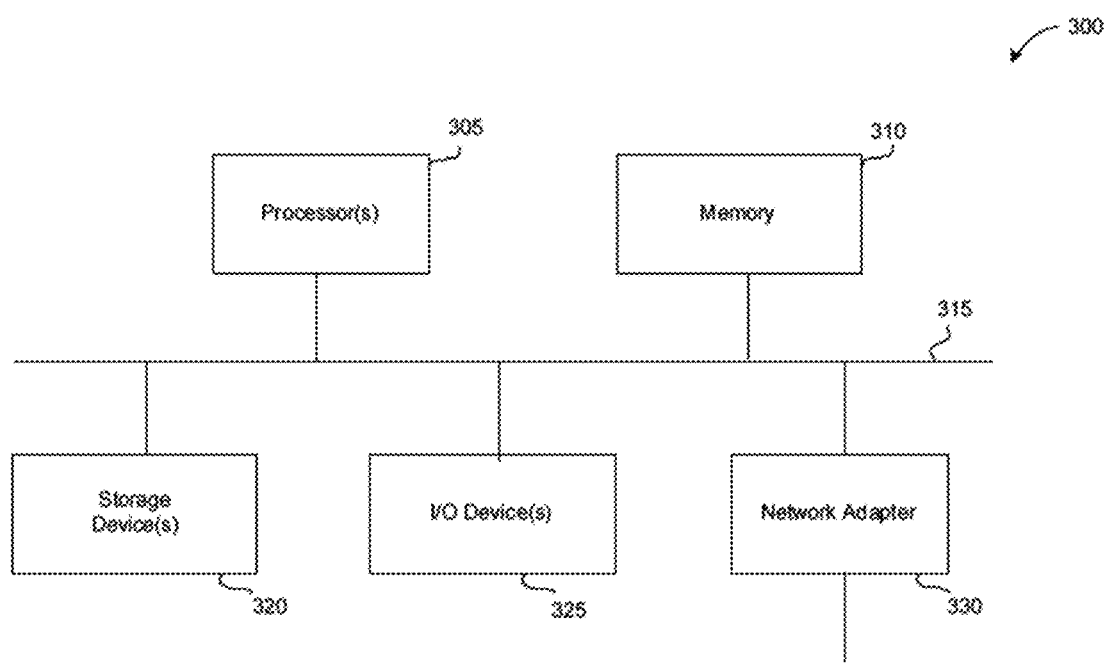
FIG. 6 shows a diagrammatic representation of a machine in the example form of a computer system within which a set of instructions for causing the machine to perform one or more of the methodologies discussed herein may be executed.

FIG. 6 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 300 may include one or more central processing units (processors) 305, memory 310, input/output devices 325, e.g. keyboard and pointing devices, touch devices, display devices, storage devices 320, e.g. disk drives, and network adapters 330, e.g. network interfaces, that are connected to an interconnect 315. The interconnect 315 is illustrated as an abstraction that represents any one or more separate physical buses, point to point connections, or both connected by appropriate bridges, adapters, or controllers. The interconnect 315, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (12C) bus, or an Institute of Electrical and Electronics Engineers (IEEE) standard 1394 bus, also called Firewire.

The memory 310 and storage devices 320 are computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 310 can be implemented as software and/or firmware to program the processor 305 to carry out actions described above. In some embodiments, such software or firmware may be initially provided to the processing system 300 by downloading it from a remote system through the computing system 300, e.g. via network adapter 330.

The various embodiments introduced herein can be implemented by, for example, programmable circuitry, e.g. one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for establishing and maintaining Payment Card Industry Data Security Standard (PCI DSS) compliant transaction flows, comprising:

a payment processor or network receiving an incoming primary account number (PAN) pursuant to a payment card transaction between a merchant and a banking customer;

said payment processor or network generating a token by translating said PAN into a token, said translation producing a token value by replacing digits within a middle portion of the PAN with random values, said translation preserving a PAN value for four digits within a terminal portion of the PAN, wherein a one-to-one relationship is maintained between said PAN and said token, wherein any said token resolves to one and only one PAN, wherein said token uniquely and securely corresponds to said PAN for purposes of BIN processing and payment card identification;

pursuant to generation of said token, said payment processor or network performing bank identification number (BIN) substitution on said PAN by replacing a BIN within said PAN with a different BIN;

said payment processor or network sending said token to an issuer bank for processing of said transaction, wherein PAN data is not derivable by said issuer bank from said token, and wherein use of said token by said issuer bank for said transaction processing is PCI DSS compliant; and upon completion of said issuer bank processing said transaction with said token downstream, said payment processor or network translating said token back into a PAN for further processing of said transaction upstream.

2. The method of claim 1, further comprising:
said payment processor or network storing said token in a token vault.

3. The method of claim 2, further comprising:
one or more issuer processors and issuers leveraging existing private connections with payment processors, wherein requests are made leveraging Web Services protocols (SOAP or JSON), requests are protected with TLS Link Layer encryption, and response data are serialized via SOAP or JSON objects.

4. The method of claim 1, further comprising:
using any of access controls and encryption to secure said PANs and said tokens.

5. The method of claim 1, further comprising:
using an application layer to process token exchange requests.

6. The method of claim 1, further comprising:
providing one or more data tables within which both said PAN and a corresponding token are arrayed a single row.

7. The method of claim 1, further comprising:
encrypting said PAN using a key stored on an attached hardware security module (HSM).

8. The method of claim 1, further comprising:
logging de-token requests; and
analyzing said de-token requests for misuse and fraud.

9. The method of claim 1, further comprising:
during token generation, said payment processor or network replacing a first number in said PAN with a replacement value to identify a resulting number uniquely as a token instead of a PAN.

10. The method of claim 1, further comprising:
during token generation, said payment processor or network preserving an original value of the last four digits of the PAN for downstream processing and identification.

11. The method of claim 10, further comprising:
during token generation, said payment processor or network combining said four digits with at least one other data element to identify an account and account holder positively without requiring a full PAN to do so.

* * * * *